P. SCHUPPLI.
CATTLE FASTENER.
APPLICATION FILED JUNE 2, 1913.
1,077,647.
Patented Nov. 4, 1913.
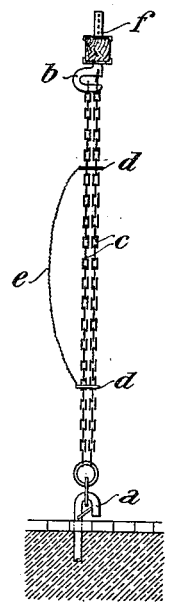
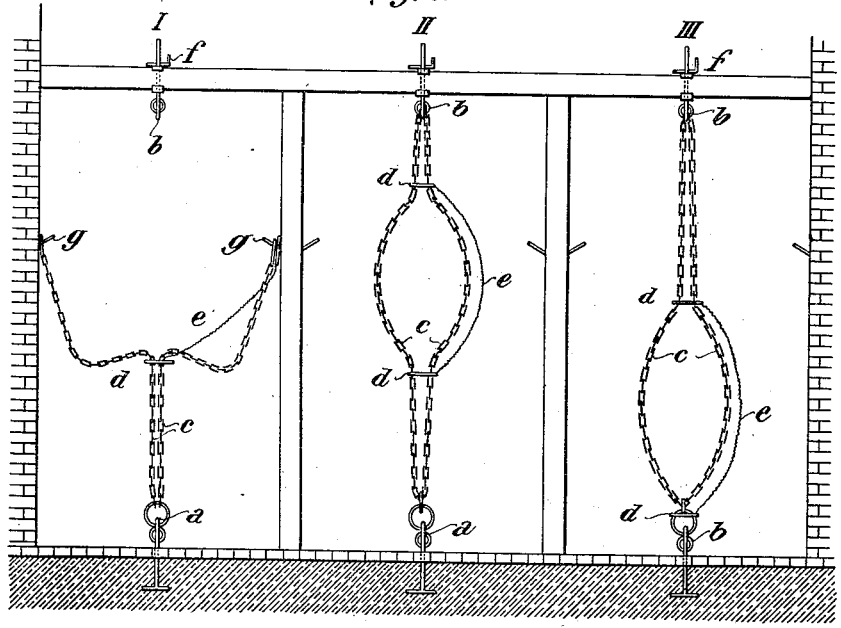
Witnesses:
E. G. McGee
C. S. Jones
Inventor:
Paul Schuppli
By Emil Bonnelycke
Attorney.

UNITED STATES PATENT OFFICE.

PAUL SCHUPPLI, OF GRABNERHOF, NEAR ADMONT, AUSTRIA-HUNGARY.

CATTLE-FASTENER.

1,077,647.  Specification of Letters Patent.  Patented Nov. 4, 1913.

Application filed June 2, 1913. Serial No. 771,335.

*To all whom it may concern:*

Be it known that I, PAUL SCHUPPLI, subject of the Emperor of Austria-Hungary, residing at Grabnerhof, near Admont, Styria, Austria-Hungary, have invented new and useful Improvements in Cattle-Fasteners, of which the following is a specification.

This invention relates to cattle fasteners and it proposes an improved device of the character indicated which essentially comprises two chains suspended side by side and adapted to surround the neck of the animal, the chains being held together by two rings above and below the neck. Similar appliances are known but in these only one chain is secured above and below, while the second chain is suspended only above and terminates below in a slide-ring. The improved construction affords double security and greater freedom of movement for the animals.

In the accompanying drawing, a constructional form of the invention is shown by way of example, Figure 1 showing one of the fasteners when not in use, and Fig. 2 showing a plurality of the fasteners in the various positions of use.

$a$, $b$, are two carbine-hooks arranged, one in the floor, and the other directly thereabove in the ceiling of the stable. $c$, $c$, are two chains fastened to the said hooks and $d$, $d$, are rings slipped over the chains $c$, $c$, and united by a chain $e$. The bills of the two carbine hooks $a$, $b$, are directed away from the stall of the animal. The upper carbine hook $b$ can be adjusted at different levels by means of a pin $f$ and is so formed that the chains $c$, $c$, on the opening of the carbine can be easily released therefrom and just as easily secured thereto again.

If the appliance is not in use, the two chains $c$, $c$, are tightened by suitably adjusting the upper carbine hook $b$ (Fig. 1). During use, the upper carbine hook $b$ is pushed downward to such an extent that those parts of the chains $c$, $c$, which are situated between the two rings $d$, $d$, bear against the neck of the animal to be chained. Fig. 2 shows the appliance in the position for use *i. e.* in position I open, in position II when the animal is standing and in position III when it is lying down. In the open position I, the chains $c$, $c$, are released from the upper carbine hook and suspended together with the upper ring $d$ from nails $g$ or the like. This fastening appliance has *inter alia* the following advantages: The chains last a long while and do not get dirty or rusty. The animals are fastened in their places in such a manner that they cannot push against each other and cannot dirty the stall, while still having sufficient freedom of movement.

I claim:

1. A cattle fastener comprising, in combination, a pair of vertical chains arranged side by side and adapted to receive between them the neck of the animal; a pair of supporting hooks to which the opposite ends of said chains are removably connected, the upper hook being vertically adjustable; a pair of rings slidable loosely over said chains and arranged one above and the other below said neck, to hold the chains together and cause the same to encircle said neck; and a flexible element connecting said rings.

2. A cattle fastener comprising, in combination, a pair of vertical chains arranged side by side and adapted to receive between them the neck of the animal; a pair of supporting devices to which the opposite ends of said chains are connected; a pair of rings slidable loosely over said chains and arranged one above and the other below said neck, to hold the chains together and cause the same to encircle said neck; and a flexible element connecting said rings.

In testimony whereof I have signed my name to this specification in the presence of two subscribing witnesses.

Dr. PAUL SCHUPPLI.

Witnesses:
 AUGUST FUGGER,
 ADA MARIA BERGER.

---

Copies of this patent may be obtained for five cents each, by addressing the "Commissioner of Patents Washington, D. C."